Aug. 18, 1931.  G. F. JONES  1,819,245
CIRCUIT BREAKER TRIPPING SYSTEM
Filed Nov. 23, 1928
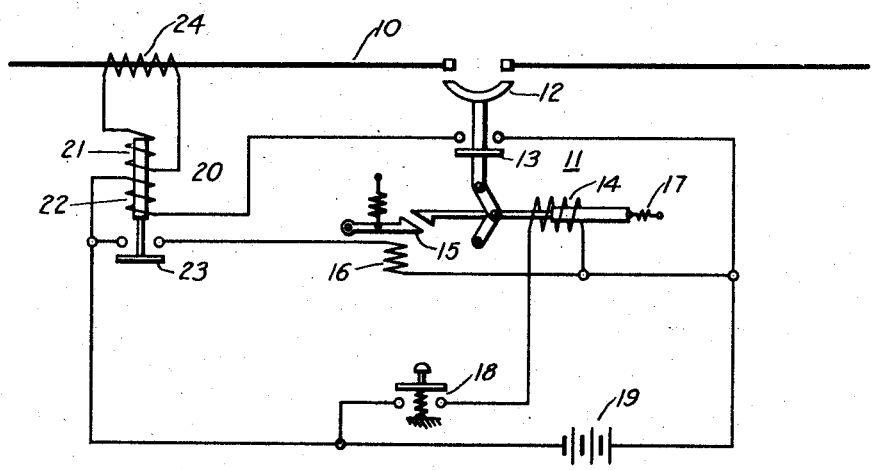
INVENTOR
Gordon F. Jones
BY
ATTORNEY Patented Aug. 18, 1931

1,819,245

UNITED STATES PATENT OFFICE

GORDON F. JONES, OF IRWIN, PENNSYLVANIA, ASSIGNOR TO WESTINGHOUSE ELECTRIC & MANUFACTURING COMPANY, A CORPORATION OF PENNSYLVANIA

CIRCUIT BREAKER TRIPPING SYSTEM

Application filed November 23, 1928. Serial No. 321,354.

This invention pertains to protective systems for automatically tripping circuit breakers in power systems and, more particularly, to systems of this type which are applicable to direct-current railway-distribution systems.

The principal object of my invention is to provide a circuit-breaker-tripping system which shall be more rapid in operation than those heretofore known.

It is an additional object of my invention to arrange a circuit-breaker system so that, when conditions have occurred which make tripping of the breaker desirable, the trip coil of the circuit breaker will be energized continuously until the breaker opens.

Another object of my invention is to eliminate the intermediate relay which has been used heretofore between the tripping relay and the circuit-breaker trip coil.

A still further object of my invention is to provide a circuit-breaker system which shall embody all the desirable features of those known heretofore and, at the same time, perform the functions of such system in a more rapid and efficient manner.

In accordance with my invention, I propose to eliminate the intermediate relay which has been used in systems of the prior art, such as those shown in the assignee's copending applications, Serial No. 81,858, filed January 16, 1926, and Serial No. 278,395, filed May 17, 1928. In such systems, it is customary to employ a current transformer or impulse coil in a load circuit. A quick-acting relay connected across said impulse coil is utilized to energize a self-locking tripping relay which is effective to energize the circuit-breaker trip coil. The quick-acting relay is provided with a polarizing coil for preventing the operation thereof upon a decrease in the current through the circuit breaker. My invention consists in so designing the quick-acting relay and its polarizing winding that such relay will perform the function of the self-locking relay of the systems heretofore employed.

A brief understanding of the system of my invention may best be obtained by reference to the accompanying drawing which illustrates a single embodiment thereof, in connection with the following description of the system and its operation.

Referring more particularly to the drawing, a load circuit 10 is controlled by means of a circuit breaker 11 having main and auxiliary contacts 12 and 13, respectively. A closing coil 14 is provided to effect the closing of the breaker, and a latch 15 operates to maintain the breaker closed so long as the trip coil 16 is deenergized. When the trip coil is energized, a spring 17 effects the opening of the circuit breaker.

A push-button switch 18 is included merely to illustrate one type of switch that may be employed to operate the circuit breaker to its closed position. The battery 19 supplies energy for the closing coil 14 and the tripping coil 16.

A relay 20 comprises two windings 21 and 22 and a contact 23 which, when closed, completes a circuit for the trip coil 16. The winding 21 is connected to a current transformer or impulse coil 24 in the load circuit 10. The winding 22 is adapted to be connected to the battery 19 or other equivalent source of current, through the auxiliary contact 13 of the circuit breaker 11, so long as the latter remains closed.

The coil 21 is so connected to the transformer 24 that, when it is energized as a result of an increase in the current in the circuit 10, the magnetic effect thereof assists that of the winding 22. On the other hand, when the current in the circuit 10 decreases, the voltage generated in the impulse coil tends to so energize the winding 21 that its magnetic effect shall be in opposition to that of the winding 22.

The winding 22, furthermore, is so designed that it alone is incapable, when energized, of closing the contact 23 of the relay 20. The winding, however, is capable of maintaining the contact 23 in the closed position after it has been actuated thereto. It will be obvious that a smaller magnetic effect will be sufficient to maintain the relay closed than is necessary to actuate it from the open position to the closed position.

The operation of this system will probably be apparent from the foregoing description but a brief outline thereof is appended.

So long as the circuit breaker 11 is closed and the current in the circuit 10 is constant, below a predetermined value, the winding 21 will be deenergized while the winding 22 will be energized to a predetermined degree from the battery 19 through the auxiliary contact 13 of the circuit breaker. The energization of the winding 22, however, is insufficient to close the contact 23 of the relay 20.

When the current in the circuit 10 increases, a voltage is induced in the transformer 24 which is effective to energize the winding 21 in such direction that it assists the winding 22 and, if the rate of increase of the current is sufficiently large, the combined effect of the windings 21 and 22 will be effective to close the relay contact.

When the contact 23 of the relay 20 is closed, a circuit is completed for the tripping coil 16 which, normally, will thereupon withdraw the latch 15 and permit the spring 17 to open the circuit breaker 11.

If the circuit breaker fails to open, however, for any reason, the tripping circuit will be maintained even though the current in the circuit 10 ceases to increase or even tends to decrease. The reason for this will be obvious, namely, that, so long as the contact 13 of the circuit breaker 11 is closed, the magnetic effect of the winding 22 will be sufficient to maintain contact 23 in closed position. The trip coil 16 will thus be energized until the circuit breaker 11 is finally tripped.

When the circuit breaker is opened, the energizing circuit for the coil 22 is interrupted at the contact 13 and the relay 20 opens its contact 23.

If the current in the circuit 10 tends to decrease instead of to increase, the effect of the winding 21 will oppose that of the winding 22, and the relay 20, therefore, will not operate. It will be obvious, of course, that it is not desirable to open the circuit breaker except when the current in the circuit 10 tends to increase at a predetermined rate.

The principal advantages of this system are, as pointed out previously, the rapid action that may be obtained in the tripping operation of the circuit breaker. No intermediate, self-locking relay is necessary since the relay 20 operates to maintain itself closed as long as the circuit breaker fails to open.

Since changes in the details of the construction and connections disclosed herein will be apparent to those skilled in the art, I do not intend to be limited to the embodiment of my invention shown and described, except as necessitated by the scope of the appended claims.

I claim as my invention:

1. A circuit-breaker system comprising an electric circuit, a circuit breaker therein having main and auxiliary contacts, a solenoid for closing said breaker, a latch for maintaining it closed, a solenoid for releasing said latch, and a spring for opening said breaker when said latch is released, a current source a relay for said releasing solenoid having two windings, one of which is adapted to be connected to the current source by said auxiliary contact, and a current transformer for energizing the other of said windings in accordance with changes in the current in said circuit, and being so connected as to aid the action of said first-mentioned coil when said current increases.

2. A circuit-breaker system comprising a main circuit, a circuit-breaker therein having main and auxiliary contacts, electromagnetic means for closing said breaker, mechanical means for latching said breaker in the closed position and for opening the breaker when said latching means is released, electromagnetic means for releasing said latch and a relay for controlling said releasing means, having a plurality of windings, one being adapted to be energized under the control of said auxiliary contact and an impulse transformer in said circuit for energizing the other of said windings.

3. In a control system for a circuit breaker in an electric circuit, the combination with closing and latching means for said breaker, of means for releasing said latching means to permit opening of the breaker including a source of current, a double-winding relay, one of the windings, in cooperation with said closing means is adapted to be energized by said source so long as the breaker is closed, the other being connected to an impulse coil in said circuit whereby it is energized in accordance with changes in the current flowing through said circuit.

4. A direct-tripping relay for a circuit breaker having main and auxiliary contacts in power and control circuits, respectively, a source of current in said control circuit, said relay comprising two windings one of which, in cooperation with said auxiliary contacts, is adapted to be energized by said source so long as said breaker is closed and is operative to maintain the relay in the closed position but inoperative to actuate the relay from open to closed position, and another winding so connected to an impulse coil in said power circuit as to aid said first-mentioned coil when the current in said circuit increases.

5. A direct-tripping relay for a circuit breaker comprising two windings, one of which is capable, when energized, of maintaining the relay in the closed position but incapable of actuating it from open to closed position, means for energizing said winding so long as said breaker is closed and a second winding and means responsive to the rate and direction of changes in the current flowing through said breaker for energizing said second winding cumulatively or differentially with respect to said first winding, depending upon the direction of said change.

6. A relay for tripping a circuit breaker including a plurality of windings individually incapable of operating said relay, means for energizing one of said windings so long as said breaker is closed, and means for so energizing another of said windings to assist or oppose the effect of said first-mentioned winding in accordance with the rate of increase or decrease in the current flowing through said breaker.

7. The combination of an electric circuit, an impulse winding associated with the circuit, a circuit breaker therein, an interlock on the breaker, closing means for the breaker, tripping means for the breaker, a source of electrical energy, a relay for controlling the operation of the tripping means, said relay comprising a plurality of operating windings, one of said windings being disposed to be connected to said source of energy through said interlock and the other winding being connected in circuit relation with the impulse winding associated with the circuit.

In testimony whereof, I have hereunto subscribed my name this 20th day of November, 1928.

GORDON F. JONES.